United States Patent [19]

Oda et al.

[11] Patent Number: 4,661,218

[45] Date of Patent: Apr. 28, 1987

[54] ION EXCHANGE MEMBRANE CELL AND ELECTROLYSIS WITH USE THEREOF

[75] Inventors: Yoshio Oda; Takeshi Morimoto; Kohji Suzuki, all of Yokohama, Japan

[73] Assignee: Asahi Glass Company, Ltd., Tokyo, Japan

[21] Appl. No.: 381,746

[22] Filed: May 24, 1982

Related U.S. Application Data

[63] Continuation of Ser. No. 205,567, Nov. 10, 1980, and a continuation of Ser. No. 355,312, Mar. 5, 1982.

[30] Foreign Application Priority Data

| | | | |
|---|---|---|---|
| Nov. 27, 1979 | [JP] | Japan | 54-152416 |
| Jan. 31, 1980 | [JP] | Japan | 55-9274 |
| Feb. 7, 1980 | [JP] | Japan | 55-13012 |
| Mar. 21, 1980 | [JP] | Japan | 55-34708 |
| May 6, 1980 | [JP] | Japan | 55-58659 |
| May 20, 1980 | [JP] | Japan | 55-65964 |
| Jun. 7, 1980 | [JP] | Japan | 55-73744 |
| Jul. 1, 1980 | [JP] | Japan | 55-88497 |
| Jul. 18, 1980 | [JP] | Japan | 55-97608 |
| Aug. 15, 1980 | [JP] | Japan | 55-111815 |
| Aug. 22, 1980 | [JP] | Japan | 55-114706 |
| Aug. 26, 1980 | [JP] | Japan | 55-116404 |
| Nov. 26, 1980 | [CA] | Canada | 365540 |
| Mar. 20, 1981 | [JP] | Japan | 56-39620 |

[51] Int. Cl.$^4$ .............................................. C25G 1/14
[52] U.S. Cl. .................................... 204/98; 204/128; 204/129; 204/283; 204/292; 204/296
[58] Field of Search .............. 204/98, 128, 129, 283, 204/296, 292

[56] References Cited

U.S. PATENT DOCUMENTS

| | | | |
|---|---|---|---|
| 4,100,050 | 7/1978 | Cook et al. | 204/252 |
| 4,135,996 | 1/1979 | Bouy et al. | 204/252 |
| 4,224,121 | 9/1980 | Dempsey et al. | 204/98 |

*Primary Examiner*—R. L. Andrews
*Attorney, Agent, or Firm*—Oblon, Fisher, Spivak, McClelland & Maier

[57] ABSTRACT

An ion exchange membrane cell which comprises an anode, a cathode, and an anode compartment and a cathode compartment partitioned by an ion exchange membrane. The ion exchange membrane is a cation exchange membrane having a gas and liquid permeable porous non-electrode layer on at least one side thereof, and the cation exchange membrane is formed by a fluorinated polymer having sulfonic acid groups and ion exchange groups having weaker acidity than the sulfonic acid groups.

25 Claims, No Drawings

ION EXCHANGE MEMBRANE CELL AND ELECTROLYSIS WITH USE THEREOF

This application is a continuation of application Ser. No. 205,567 filed Nov. 10, 1980, and a continuation in part of application Ser. No. 355,312, filed Mar. 5, 1982.

BACKGROUND OF THE INVENTION

1. Field of the Invention

The present invention relates to an electrolytic cation exchange membrane electrolytic cell. More particularly, it relates to a cation exchange membrane electrolytic cell suitable for electrolysis of an aqueous solution of an electrolyte such as water, an acid, a base, an alkali metal halide or an alkali metal carbonate, and to an ion exchange membrane for the electrolytic cell.

2. Description of the Prior Art

As a process for producing an alkali metal hydroxide and chlorine by the electrolysis of the abovementioned aqueous solution, particularly an aqueous solution of an alkali metal chloride, a diaphragm method has now been used in place of a mercury method with a view to preventing environmental pollution. Further, in order to efficiently obtain an alkali metal hydroxide having a high purity in a high concentration, it has been proposed and put into practical use to employ an ion exchange membrane.

On the other hand, from the standpoint of energy saving, it is desired to minimize the cell voltage in the electrolysis of this type. For this purpose, various methods have been proposed. However, in some cases, the cell voltage reduction is not yet adequate and in other cases, the electrolytic cell tends to be intricate, and thus no adequately satisfactory solution has yet been made.

The present inventors have conducted a research with an aim to carry out electrolysis of an aqueous solution at a minimal load voltage, and as a result, it has been found that the above object can be accomplished with use of a cation exchange membrane having a gas and liquid permeable porous non-electrode or non-electrocatalytic layer on at least one side thereof. This has been made the subject matter of European Patent Publication No. 0029,751 or U.S. Ser. No. 205567 and Ser. No. 355312.

The effectiveness for reducing the cell voltage obtainable by the use of such a cation exchange membrane having a porous layer on its surface, varies depending upon the material constituting the porous layer, the porosity and the thickness of the layer. However, it is regarded as an unexpected phenomenon that a high level of cell voltage-reducing effectiveness is obtainable even when the porous layer is made of an electrically non-conductive material as will be described hereinafter, or that the cell voltage can be reduced even when such a cation exchange membrane is disposed with a space from the electrode, whereby the electrode may not necessarily be disposed in contact with the membrane.

SUMMARY OF THE INVENTION

From a further study on the abovementioned cation exchange membrane, it has been found that it is possible not only to reduce the cell voltage in the electrolysis but also to improve the current efficiency over the conventional methods by forming the cation exchange membrane having a porous layer on its surface with a certain fluorinated polymer having sulfonic acid groups and cation exchange groups having weaker acidity than the sulfonic acid groups.

Thus, it is an object of the present invention to provide an electrolytic cation exchange membrane which is capable of reducing the cell voltage and improving the current efficiency when applied to an electrolytic cell.

Another object of the present invention is to provide an ion exchange membrane cell in which such a cation exchange membrane is used.

A further object of the present invention is to provide a process for electrolyzing an aqueous solution of an alkali metal chloride in an electrolytic cell wherein the abovementioned cation exchange membrane is used.

The present invention provides an ion exchange membrane cell comprising an anode, a cathode, and an anode compartment and a cathode compartment partitioned by an ion exchange membrane, in which said ion exchange membrane is a cation exchange membrane having a gas and liquid permeable porous non-electrode or non-electrocatalytic layer on at least one side thereof and said cation exchange membrane is formed by a fluorinated polymer having sulfonic acid groups and ion exchange groups having weaker acidity than the sulfonic acid groups.

The electrolytic cation exchange membrane according to the present invention has a gas and liquid permeable porous non-electrode layer on at least one side thereof and is characterized in that said cation exchange membrane is formed by a fluorinated polymer having sulfonic acid groups and ion exchange groups having weaker acidity than the sulfonic acid groups.

The process for electrolyzing an aqueous solution of an alkali metal chloride according to the present invention is carried out in the abovementioned electrolytic cell in which the abovementioned cation exchange membrane is used.

The electrolytic cation exchange membrane according to the present invention provides a minimal cell voltage and a high current efficiency which have not been obtainable by the conventional methods, and such superior effectiveness is obtainable even from the initial stage of the electrolysis when such a cation exchange membrane is used. Thus, the industrial significance of the cation exchange membrane of the present invention is extremely high.

DETAILED DESCRIPTION OF THE PREFERRED EMBODIMENTS

The gas and liquid permeable porous layer provided on the cation exchange membrane according to the present invention is formed preferably by bonding particles onto the membrane surface. The amount of the particles applied to form the porous layer varies depending upon the nature and size of the particles. However, according to the research made by the present inventors, it has been found that the amount of the particles is preferably from 0.001 to 100 mg., especially from 0.005 to 50 mg. per 1 $cm^2$ of the membrane surface. If the amount is too small, the desired level of effectiveness expected by the present invention is not obtainable. On the other hand, the use of an excessively large amount tends to lead to an increase of the membrane resistance.

The particles forming the gas and liquid permeable porous layer on the surface of the cation exchange membrane of the present invention may be electrically conductive or non-conductive and may be made of inorganic material or organic material, so long as they do not function as an electrode. However, the particles are preferably made of material having corrosion resistance against the electrolyte solution. Moreover, an inorganic material is more preferably used than an organic material because of its superior performance in the voltage reduction.

As preferred specific material for the porous layer on the anode side, there may be used a single substance, an alloy, an oxide, a hydroxide, a nitride or a carbide of a metal of Group IV-A (preferably silicon, germanium, tin or lead), Group IV-B (preferably titanium, zirconium or hafnium) or Group V-B (preferably niobium or tantalum) of the Periodic Table, an iron group metal (iron, cobalt or nickel), chromium, manganese or boron, polytetrafluoroethylene, or an ethylene-tetrafluoroethylene copolymer.

On the other hand, for the porous layer on the cathode side, there may preferably be used, in addition to the materials useful for the formation of the porous layer on the anode side, silver, zirconium or their alloys, stainless steel, carbon (active carbon or graphite), a polyamide resin, a polysulfonic resin, a polyphenyleneoxide resin, a polyphenylenesulfide resin, a polypropylene resin or a polyimide resin.

In the formation of the porous layer, the abovementioned particles are used preferably in a form of powder having a particle size of from 0.01 to 300μ, especially from 0.1 to 100μ. In some cases, there may be used a binder, for example, a fluorocarbon polymer such as polytetrafluoroethylene or polyhexafluoroethylene, or a viscosity controlling agent, for example, a cellulose material such as carboxymethyl cellulose, methyl cellulose or hydroxyethyl cellulose or a water-soluble material such as polyethylene glycol, polyvinyl alcohol, polyvinyl pyrrolidone, sodium polyacrylate, polymethylvinyl ether, casein or polyacrylamide. Such a binder or viscosity controlling agent is used preferably in an amount of from 0.1 to 50% by weight, especially from 0.5 to 30% by weight based on the abovementioned powder.

Further, if desirable, it is possible to incorporate a suitable surfactant such as a long chain hydrocarbon or a fluorinated hydrocarbon and graphite or other conductive filler to facilitate the bonding of the particles or groups of particles onto the membrane surface.

To bond the particles or groups of particles onto the ion exchange membrane to form a porous layer, the abovementioned conductive or non-conductive particles and, if necessary, a binder and a viscosity controlling agent, are sufficiently mixed in a suitable medium such as an alcohol, ketone, ether or hydrocarbon, and the paste of the mixture thus obtained is applied to the membrane surface by e.g. screen printing. Instead of the paste of the mixture comprising the abovementioned particles or groups of particles, a syrup or a slurry of the mixture may be prepared and it may be sprayed onto the membrane surface to bond the particles or groups of particles thereto.

The particles or groups of particles applied to the ion exchange membrane to form a porous layer is then preferably heat-pressed on the ion exchange membrane at a temperature of from 80° to 220° C. under pressure of from 1 to 150 kg/cm$^2$ or 1 to 150 kg/cm with use of a flat press or rolls press respectively. It is preferred to partially embed the particles or groups of particles into the membrane surface.

The porous layer formed by the particles or groups of particles bonded to the membrane surface preferably has a porosity of at least 10 to 95%, especially at least 30 to 90% and a thickness of from 0.01 to 100μ, especially from 0.1 to 50μ, which is less than that of the membrane.

The porous layer formed on the membrane surface, may be a thick layer in which a great amount of particles are bonded to the membrane surface. Otherwise, it is possible to form the layer to have a single layer structure in which the particles or groups of particles are independently bonded to the membrane surface without being in contact with one another. In such a case, the amount of the particles to be used for the formation of the porous layer can substantially be reduced and it is thereby possible in some cases to simplify the means for forming the porous layer.

Further, instead of applying the particles onto the membrane surface as mentioned above, it is possible to form the porous layer of the present invention also by bonding to the membrane surface a porous layer preliminarily formed to have the abovementioned properties. In such a case, preformed porous layer may advantageously be formed on a film made of a polymer such as polytetrafluoroethylene and polyester, and then the resulting preformed layer on said film is transferred to a surface of a membrane.

The cation exchange membrane on which the porous layer is formed according to the present invention, must be a membrane formed by a fluorinated polymer having sulfonic acid groups and ion exchange groups having weaker acidity than the sulfonic acid groups. The membrane of the present invention has weakly acidic groups as well as sulfonic acid groups (i.e. —SO$_3$M where M is hydrogen or an alkali metal). As the weakly acidic groups, there may be mentioned carboxylic acid groups (i.e. —COOM where M is as defined above), phosphoric acid groups (i.e. —PO$_3$M$_2$ where M is as defined above) or hydroxyl groups (i.e. —OM where M is as defined above). Among them, the carboxylic acid groups are particularly preferred.

The ion exchange capacity of the membrane is preferably from 0.5 to 4.0 milliequivalent/gram dry polymer, especially from 0.7 to 2.0 milliequivalent/gram dry polymer each for the sulfonic acid groups and the weakly acidic ion exchange groups. It is generally desirable for the electrochemical characteristics of the membrane, such as electric resistance, that the weakly acidic ion exchange groups have a greater ion exchange capacity than the sulfonic acid groups.

The cation exchange membrane of the present invention composed of a fluorinated polymer having sulfonic acid groups and weakly acidic groups, may take various forms. For instance, it may be a membrane integrally formed by blending two kinds of polymers, i.e. a fluorinated polymer having sulfonic acid groups and a fluorinated polymer having weakly acidic groups, or a membrane integrally formed by laminating such two kinds of the fluorinated polymers. Further, it may be a membrane in which sulfonic acid groups on at least one side of a film of a fluorinated polymer having the sulfonic acid groups are converted to weakly acidic groups, or a membrane in which weakly acidic groups on at least one side of a film of a fluorinated polymer having the weakly acidic groups are converted to sulfonic acid groups. Among them, the membranes formed by blending or laminating the two kinds of the fluorinated polymers are particularly preferred since a proper ion exchange capacity may be obtained by the combination of the sulfonic acid groups and the weakly acidic groups having different ion exchange capacities.

As the fluorinated polymers having sulfonic acid groups or weakly acidic groups according to the present invention, there may be used a variety of fluorinated polymers, but among them, polymers having the recurring units (a) and (b) are particularly preferred.

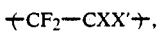

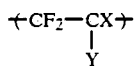

wherein X is —F, —Cl, —H or —CF$_3$, X' is X or CF$_3$(CF$_2$)$_m$ where m is from 1 to 5, Y is selected from the following:

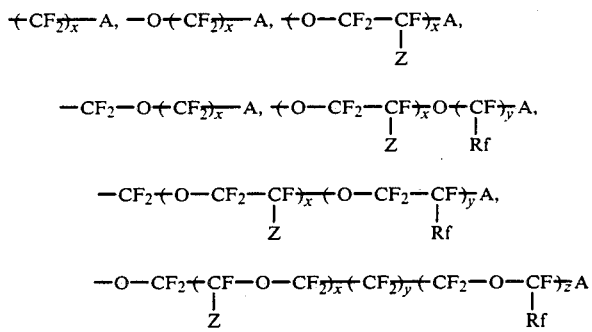

where x, y and z respectively represent an integer of 0 to 10, Z and Rf respectively represent —F or a perfluoroalkyl group having from 1 to 10 carbon atoms, and A represents —SO$_3$M, —COOM, —PO$_3$M$_2$ or a functional group convertible into these groups, such as —SO$_2$F, —CN, —COF or —COOR, where M is hydrogen or an alkali metal and R is an alkyl group having from 1 to 10 carbon atoms.

As mentioned above, the cation exchange membrane to be used in the present invention is formed to have an ion exchange capacity of from 0.5 to 4.0 milliequivalent/gram dry polymer. In the case of forming the ion exchange membrane from a copolymer comprising the polymer units (a) and (b), it is preferred that the polymer units (b) constitute from 1 to 40 molar %, especially from 3 to 25 molar %.

The ion exchange membrane may be prepared by various methods per se known, and if required, the ion exchange membrane may preferably be reinforced by a woven fabric such as cloth or net, or non-woven fabric, or fibril made of a fluorinated polymer such as polytetrafluoroethylene, or by a mesh or perforated material made of metal. The ion exchange membrane of the present invention preferably has a thickness of from 20 to 1000μ, especially from 50 to 500μ.

When the porous layer is formed on the membrane surface on the anode or cathode side or both sides of the ion exchange membrane, the ion exchange groups of the membrane should take a suitable form not to lead to decomposition thereof. For instance, in the case of carboxylic acid groups, they should preferably take a form of an acid or an ester, and in the case of sulfonic acid groups, they should preferably take a form of —SO$_2$F.

In the case where the membrane of the present invention is formed by blending fluorinated polymers having sulfonic acid groups and weakly acidic groups, the ratio of the two kinds of the fluorinated polymers may optionally be selected. If it particularly preferred that from 90 to 10 parts by weight of the polymer having weakly acidic groups is blended with from 10 to 90 parts by weight of the polymer having sulfonic acid groups, and especially, from 75 to 25 parts of the former is blended with from 25 to 75 parts of the latter. The preparation of the membrane by such blending may be carried out by, for instance, the method disclosed in U.S. Pat. No. 4,176,215.

In the case where the ion exchange membrane is formed by laminating two kinds of fluorinated polymer films, the thickness of the two films may not necessarily be the same but may be optionally varied depending on the natures of the respective copolymers. However, from the study made by the present inventors, it has been found that the film of a fluorinated polymer containing weakly acid groups should preferably have a thickness of 1 to 300μ, especially 5 to 200μ, depending on the thickness of the ion exchange membrane. The lamination of the two fluorinated copolymer films may be conducted by any suitable method. However, it is necessary that the two films are made into an integral form by the lamination. For instance, the lamination is carried out by pressing preferably at a temperature of from 100° to 350° C. and under pressure of from 0.5 to 100 kg/cm$^2$.

Further, in the case where the membrane of the present invention is formed by converting the ion exchange groups on at least one side of a film of a fluorinated polymer having suolfonic acid groups or of a film of a fluorinated polymer having weakly acidic groups, into the weakly acidic groups or into the sulfonic acid groups, such as operation may preferably carried out in the following manner. Namely, in the case of converting the sulfonic acid groups to weakly acidic groups, the layer to be subjected to such conversion should preferably have a thickness of upto 3μ, especially up to 50μ. Such conversion may be carried out by, for instance, the method disclosed in U.S. Pat. No. 4,151,053.

On the other hand, in the case of converting the weakly acidic groups to sulfonic acid groups, there is no particular restriction as to the thickness of the layer to be subjected to the conversion, but usually the layer to be subjected to the conversion has a thickness of up to 100μ, preferably up to 50μ. Such conversion is carried out by, for example, a method disclosed in European Patent Publication No. 0026,979 or U.S. Ser. No. 171,286.

In a case where the membrane of the present invention has sulfonic acid groups on one side thereof and weakly acidic groups on the other side, it is preferred to arrange the membrane so that the surface having the weakly acidic groups faces the cathode in the electrolytic cell.

Any type of the electrode may be used for the membrane of the present invention. For instance, there may be used foraminous electrodes such as a perforated plate, a net or an expanded metal. As a typical example of the foraminous electrode, there may be mentioned an expanded metal having a major length of from 1.0 to 10 mm, a minor length of from 0.5 to 10 mm, a width of a mesh of from 0.1 to 1.3 mm and a opening area of from 30 to 90%. Further, a plurality of electrode meshes may be used. In such a case, it is preferred that a plurality of electrode meshes having different opening areas are arranged so that meshes having a less opening area are set closer to the membrane.

The anode is usually made of a platinum group metal or a conductive oxide or a conductive reduced oxide thereof. On the other hand cathode is usually made of a platinum group metal or a conductive oxide thereof or an iron group metal.

As the platinum group metal there may be mentioned Pt, Rh, Ru, Pd and Ir. As the iron group metal, there may be mentioned iron, cobalt, nickel, Raney Nickel, stabilized Raney nickel, stainless steel, a stainless steel treated by etching with a base (U.S. Pat. No. 4,255,247) Raney nickel plated cathode (U.S. Pat. Nos. 4,170,536 and 4,116,804) nickel rhodanate plated cathode (U.S. Pat. Nos. 4,190,514 and 4,190,516).

When foraminous electrodes, are used, they may be made of the materials for the anode or the cathode by themselves. When the platinum metal or a conductive oxide thereof is used, it is usually preferable to coat such material on an expanded metal made of a valve metal such as titanium or tantalum.

When the electrodes are placed in the electrolytic cell of the present invention, they may be disposed to contact the ion exchange membrane, or they may be placed with an appropriate space from the ion exchange membrane. The electrodes are preferably moderately pressed to the porous layer at a pressure of e.g. from 0.01 to 5.0 kg/cm$^2$ rather than forcibly pressed to the ion exchange membrane via the porous layer.

Further, in a case where the porous layer was provided on only one side of the ion exchange membrane, i.e. on either the anode or cathode side, according to the present invention, the electrode placed on the side of the ion exchange membrane provided with no porous layer, may likewise be disposed in contact with or with a space from the ion exchange membrane.

The electrolytic cell used in the present invention may be a monopolar or bipolar type so long as it has the abovementioned structure. The electrolytic cell used in the electrolysis of an aqueous solution of an alkali metal chloride, is made of a material being resistant to the aqueous solution of the alkali metal chloride and chlorine such as valve metal like titanium in the anode compartment and is made of a material being resistant to an alkali metal hydroxide and hydrogen such as iron, stainless steel or nickel in the cathode compartment.

In the present invention, the process condition for the electrolysis of an aqueous solution of an alkali metal chloride can be the known condition. For instance, an aqueous solution of an alkali metal chloride (from 2.5 to 5.0 Normal) is fed into the anode compartment and water or a dilute solution of an alkali metal hydroxide is fed into the cathode compartment and the electrolysis is preferably conducted at a temperature of from 80° to 120° C. and at a current density of from 10 to 100 A/dm$^2$. In this case, heavy metal ions such as calcium or magnesium ions in the aqueous solution of the alkali metal chloride tend to lead to degradation of the ion exchange membrane, and therefore, it is desirable to minimize the presence of such heavy metal ions. Further, in order to prevent the generation of oxygen at the anode as far as possible, an acid such as hydrochloric acid may be added to the aqueous alkali metal chloride solution.

In the foregoing, the use of the membrane of the present invention has been described primarily with respect to the electrolysis of an aqueous alkali metal chloride solution. However, it should be understood that the membrane of the present invention is likewise applicable to the electrolysis of water, a halogen acid (hydrochloric acid or hydrobromic acid).

Now, the present invention will be described with reference to Examples which are provided for the purpose of illustration and are not intended to limit the present invention.

EXAMPLE 1

A mixture comprising 10 parts of α-silicon carbide powder having an average particle size of 5μ, one part of modified PTFE particles having a particle size of not more than 0.5μ and prepared by coating particles of polytetrafluoroethylene with a copolymer of tetrafluoroethylene and $CF_2=CFO(CF_2)_3COOCH_3$, 0.3 part of methyl cellulose (2% aqueous solution having a viscosity of 1500 cps), 14 parts of water, 2 parts of cyclohexanol and one part of cyclohexanone, was kneaded to obtain a paste.

The paste was screen-printed on the cathode side surface of the ion exchange membrane having a thickness of 280μ and prepared by press-forming under pressure of 50 kg/cm$^2$ at 240° C. for 5 minutes a mixture obtained by mixing one part by weight of a copolymer (ion exchange capacity: 0.83 milliequivalent/gram polymer) of tetrafluoroethylene and

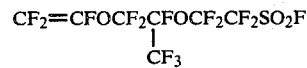

and 2 parts by weight of a copolymer (ion exchange capacity: 1.10 milliequivalent/gram polymer) of tetrafluoroethylene and $CF_2=CFO(CF_2)_3COOCH_3$ on a 4-inch roll at 240° C. for 5 minutes, with use of a polyester screen having 200 mesh and a thickness of 75μ, a printing plate provided with a screen mask located beneath the screen and having a thickness of 30μ and a polyurethane squeegee. The printed layer thus formed on the cathode side surface of the ion exchange membrane was dried in the air and solidified.

In the same manner, rutile type $TiO_2$ powder having an average particle size of 5μ was screen-printed on the anode side surface of the ion exchange membrane, and then dried in the air. Then, titanium oxide powder and silicon carbide powder were press-bonded to the ion exchange membrane at a temperature of 140° C. under pressure of 30 kg/cm$^2$. The amounts of the titanium oxide powder and the silicon carbide powder deposited on the membrane surface were 1.1 mg. and 0.8 mg., respectively, per 1 cm$^2$ of the membrane surface. Thereafter, the ion exchange membrane was subjected to hydrolysis by dipping it in an aqueous solution containing 25% by weight of sodium hydroxide at 90° C. for 16 hours.

EXAMPLE 2

A film (thickness: 250μ) of a copolymer (ion exchange capacity: 1.03 milliequivalent/gram polymer) of tetrafluoroethylene and

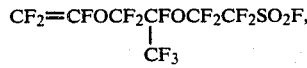

reinforced with tetrafluoroethylene cloth (70 mesh), was laid on a film (thickness: 30μ) of a copolymer (ion exchange capacity: 1.30 milliequivalent/gram polymer)

of tetrafluoroethylene and CF$_2$=CFO(CF$_2$)$_3$COOCH$_3$, and they were laminated by roll-press method under 40 kg/cm$^2$ at 200° C.

On the membrane surface constituting the anode side surface of the said laminated membrane and composed of a copolymer of tetrafluoroethylene and

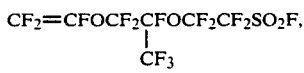

rutile type titanium oxide powder having an average particle size of 5μ was screen-printed with use of the same paste as used in Example 1 and dried, and on the opposite cathode side membrane surface, α-type silicon carbide powder having an average particle size of 5μ was screen-printed and dried.

Thereafter, titanium oxide powder and silicon carbide powder were press-bonded to the ion exchange membrane at a temperature of 140° C. under pressure of 30 kg/cm$^2$. The amounts of the titanium oxide powder and the silicon carbide powder were 1.1 mg. and 0.8 mg., respectively, per 1 cm$^2$ of the membrane surface. Thereafter, the ion exchange membrane was subjected to hydrolysis by dipping it in an aqueous solution containing 25% by weight of sodium hydroxide at 90° C. for 16 hours.

EXAMPLE 3

A laminated membrane was obtained in the same manner as in Example 2 except that as the cathode side film, there was used a film having an ion exchange capacity of 1.15 milliequivalent/gram polymer and a thickness of 30μ and composed of a copolymer of tetrafluoroethylene and CF$_2$=CFOCF$_2$CF(CF$_3$)O(CF$_2$)$_3$COOCH$_3$.

On the membrane surface constituting the anode side surface of the laminated membrane and composed of the copolymer of tetrafluoroethylene and

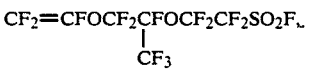

titanium oxide powder having an average particle size of 5μ was screen-printed with use of the same paste as used in Example 1 and dried and on the opposite cathode membrane surface, α-type silicon carbide powder having an average particle size of 5μ was screen-printed and dried.

Thereafter, titanium oxide powder and silicon carbide powder were press-bonded to the ion exchange membrane at a temperature of 140° C. under pressure of 30 kg/cm$^2$. The amounts of the titanium oxide powder and the silicon carbide powder were 1.1 mg. and 0.8 mg., respectively, per 1 cm$^2$ of the membrane surface. Then, the ion exchange membrane was subjected to hydrolysis by dipping it in an aqueous solution containing 25% by weight of sodium hydroxide at a temperature of 90° C. for 16 hours.

EXAMPLE 4

CF$_2$=CF$_2$ and CF$_2$=CFOCF$_2$CF(CF$_3$)OCF$_2$CF$_2$SO$_2$F were copolymerized in 1,1,2-trichloro-1,2,2-trifluoroethane at a polymerization temperature of 45° C. under pressure of 5 atm. with use of perchloropropionylperoxide as the initiator.

The film thereby obtained and having an ion exchange capacity of 0.95 milliequivalent and a thickness of 280μ, was saponified in methanol containing 50% of 2.5 N NaOH at 60° C. for 16 hours, converted to its acid type in 1N hydrochloric acid, and then refluxed in a mixture of phosphorus pentachloride and phosphorus oxychloride (1:1) under heating at 120° C. for 20 hours to convert its ion exchange groups to a sulfonyl chloride type.

Two sheets of such films were fixed to each other in a form of a bag with use of a packing made of polytetrafluoroethylene, and the bag-shaped films were immersed in an aqueous solution containing 57% of hydroiodic acid at 80° C. for 24 hours to have only one side of each film reacted. The reacted surface of the membrane thus obtained was measured by infrared absorption spectrum, whereby the absorption of 1780 cm$^{-1}$ by carboxylic acid groups was observed.

The membrane surface thus converted to carboxylic acid groups was further treated in an aqueous solution containing 95% of methanol at room temperature for 16 hours, and then dried at room temperature for 3 hours and at 60° C. for 3 hours.

Then, in the same manner as in Example 1, a porous layer composed of titanium oxide was applied to the non-treated surface on the anode side of the membrane and a porous layer composed of α-type silicon carbide was applied to the treated surface on the cathode side of the membrane.

EXAMPLE 5

Tetrafluoroethylene and CF$_2$=CFO(CF$_2$)$_3$COOCH$_3$ were copolymerized in a bulk system at 65° C. with use of azobisisobutylonitrile as the initiator to obtain a copolymer having an ion exchange capacity of 1.47 milliequivalent/gram polymer and TQ of 235° C. The copolymer was press-formed at 235° C. to obtain a film having a thickness of 280μ. Two sheets of such films were fixed to each other and sealed around their periphery with a packing made of polyester film, and then they were immersed in a 25 wt. % sodium hydroxide solution at 90° C. for one hour, washed with water and thereafter subjected to heat treatment at 250° C. in an electric furnace. Then, the films were immersed in Tetraglime containing cesium fluoride and sulfuryl fluoride was introduced. After the reaction at 70° C. for 5 hours, the fixed films were then taken out and peeled from each other. The separated films were immersed in a 25 wt. % sodium hydroxide solution at 90° C. for 16 hours. Both surfaces of each film were inspected by surface infrared spectrum whereby on the treated surface, the absorption by —SO$_3$N$_2$ was observed at 1060 cm$^{-1}$ and on the non-treated opposite side surface, the absorption by —COON$_2$ was observed at 1680 cm$^{-1}$. From the measured surface by XMA (X-ray microanalyser) of sulfur in the cross sectional direction of the membrane, the layer of —SO$_3$N$_2$ was found to have a thickness of 10μ from the treated surface.

On the other hand, prior to the immersion in a 25 wt. % sodium hydroxide solution at 90° C. for 16 hours, an ion exchange membrane was prepared in the same manner as in Example 1 to have a porous layer composed of titanium oxide on the treated surface on the anode side of the membrane and a porous layer composed of α-type silicon carbide on the non-treated surface on the cathode side of the membrane.

EXAMPLES 6 TO 10

Cation exchange membranes having a porous layer on their membrane surface were prepared in the same manner as in Example 2 except that the modified PTFE was omitted from the paste in Example 2 and the composition of the paste was changed as shown in Table 1 where the materials and the sizes and the amounts of the particles are indicated.

The particles used were prepared from the commercially available materials by pulverizing and classifying them to have the particle sizes as shown in Table 1. Further, from the microscopic observation of the porous layer on the membrane surface in Example 8, it was observed that the particles or groups of particles were bonded to the membrane surface with a space from one another.

TABLE 1

| Example Nos. | Anode side Material (average particle size) Amount of deposition | Cathode side Material (average particle size) Amount of deposition |
|---|---|---|
| 6 | $SnO_2$ (3μ) 1.1 mg/cm$^2$ | NiO (6μ) 1.5 mg/cm$^2$ |
| 7 | $Fe_2O_3$ (1μ) 0.05 mg/cm$^2$ | β-SiC (5μ) 0.1 mg/cm$^2$ |
| 8 | $ZrO_2$ (4μ) 0.9 mg/cm$^2$ | $B_4C$ (2μ) 1.2 mg/cm$^2$ |
| 9 | $Fe(OH)_2$ (0.2μ) 0.2 mg/cm$^2$ | Graphite (2μ) 0.4 mg/cm$^2$ |
| 10 | $ZrO_2$ (8μ) 1.0 mg/cm$^2$ | α-SiC (5μ) 1.0 mg/cm$^2$ |

Comparative Example 1

An ion exchange membrane having a titanium oxide layer on its anode side surface and a silicone carbide layer on its cathode side surface, was prepared in the same manner as in Example 1 except that a film having a thickness of 280μ and composed of a copolymer (ion exchange capacity: 1.03 milliequivalent/gram polymer) of tetrafluoroethylene and

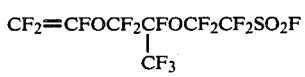

$$CF_2=CFOCF_2CFOCF_2CF_2SO_2F$$
$$\phantom{CF_2=CFOCF_2}|\phantom{CFOCF_2CF_2SO_2F}$$
$$\phantom{CF_2=CFOCF_2CFOC}CF_3$$

was used as the ion exchange membrane in Example 1.

Comparative Example 2

An ion exchange membrane having a titanium oxide layer on its anode side surface and a silicon carbide layer on its cathode side surface, was prepared in the same manner as in Example 1 except that a film having a thickness of 280μ and composed of a copolymer (ion exchange capacity: 1.44 milliequivalent/gram polymer) of tetrafluoroethylene and $CF_2=CFO(CF_2)_3COOCH_3$, was used as the ion exchange membrane in Example 1.

Now, the electrolytic performances of the ion exchange membranes of the present invention will be described with reference to Application Examples.

Application Example 1

An anode having a low chlorine overvoltage and made of an expanded metal (major length: 5 mm, minor length: 2.5 mm) coated with a solid solution of ruthenium oxide, irridium oxide and titanium oxide, was press-fixed on the anode side surface of the ion exchange membrane and a cathode having a low hydrogen overvoltage and made of a SUS 304 expanded metal (major length: 5 mm, minor length: 2.5 mm) subjected to etching treatment in a 52 wt. % sodium hydroxide aqueous solution at 150° C. for 52 hours, was press-fixed on the cathode side surface of the ion exchange membrane. Electrolysis was carried out at 90° C. under 40 A/dm$^2$ while supplying an aqueous solution of 3.5N sodium chloride to the anode compartment and water to the cathode compartment and maintaining the sodium chloride concentration in the anode compartment at a level of 3.5N and the sodium hydroxide concentration in the cathode compartment at a level of 35% by weight, whereupon the results as shown in Table 2 were obtained.

In the Application Examples, the ion exchange membranes having a porous layer are identified by the numbers of Examples.

TABLE 2

| Nos. | Membranes | Cell voltage (V) | Current efficiency (%) |
|---|---|---|---|
| 1 | Example 1 | 3.65 | 88.2 |
| 2 | Example 2 | 3.24 | 96.0 |
| 3 | Example 3 | 3.27 | 95.8 |
| 4 | Example 4 | 3.40 | 97.1 |
| 5 | Example 5 | 3.18 | 91.8 |
| 6 | Example 6 | 3.25 | 95.5 |
| 7 | Example 7 | 3.29 | 96.5 |
| 8 | Example 8 | 3.26 | 95.3 |
| 9 | Example 9 | 3.24 | 95.0 |
| 10 | Example 10 | 3.22 | 96.0 |
| 11 | Comparative Example 1 | 3.22 | 79.5 |
| 12 | Comparative Example 2 | 3.20 | 92.6 |

Application Example 2

Electrolysis was carried out in the same manner as in Application Example 1 except that the anode and the cathode were not press-fixed on the ion exchange membrane and they were respectively placed with a space of 1.0 mm from the ion exchange membrane, whereupon the results as shown in Table 3 were obtained.

TABLE 3

| Nos. | Membranes | Cell voltages (V) | Current efficiency (%) |
|---|---|---|---|
| 1 | Example 2 | 3.25 | 96.2 |
| 2 | Example 3 | 3.29 | 95.9 |
| 3 | Example 4 | 3.37 | 97.2 |
| 4 | Example 6 | 3.26 | 95.7 |
| 5 | Example 7 | 3.30 | 96.6 |
| 6 | Example 8 | 3.27 | 95.8 |
| 7 | Example 10 | 3.29 | 96.1 |
| 8 | Comparative Example 2 | 3.23 | 92.9 |

What is claimed is:

1. In a process for electrolyzing an aqueous solution of an electrolyte in an electrolytic cell comprising, an anode, a cathode and an anode compartment and a cathode compartment partitioned by an ion exchange membrane, an improvement characterized in that said ion exchange membrane is a cation exchange membrane having a gas and liquid permeable porous non-electrode layer on at least one side thereof and said cation exchange membrane is formed by a fluorinated polymer having sulfonic acid groups and ion exchange groups having weaker acidity than the sulfonic acid groups.

2. The process according to claim 1 wherein said electrolyte is an alkali metal chloride.

3. The process according to claim 2 wherein said electrolysis is performed by feeding an aqueous solution of an alkali metal chloride having a concentration of 2.5 to 5.0 N into said anode compartment at a temperature of 60° to 120° C. at a current density of 10 to 100 A/dm².

4. The process according to claim 2 or 3 wherein water or a dilute aqueous solution of a base is fed into said cathode compartment to obtain an aqueous solution of an alkali metal hydroxide having a concentration of 20 to 50 wt. %.

5. The process according to claim 1 wherein said electrolyte is water, an acid, a base or an alkali metal carbonate.

6. In an ion exchange membrane cell which comprises an anode, a cathode, and an anode compartment and a cathode compartment partitioned by an ion exchange membrane, an improvement characterized in that said ion exchange membrane is a cation exchange membrane having a gas and liquid permeable porous non-electrode layer on at least one side thereof and said cation exchange membrane is formed by a fluorinated polymer having sulfonic acid groups and ion exchange groups having weaker acidity than the sulfonic acid groups.

7. The ion exchange membrane cell according to claim 6 wherein the gas and liquid permeable porous layer is formed by an electrically conductive or non-conductive inorganic or organic material and applied in an amount of from 0.001 to 100 mg/cm².

8. The ion exchange membrane cell according to claim 6 or 2 wherein each of the sulfonic acid groups and the ion exchange groups having weaker acidity has an ion exchange capacity of from 0.5 to 4.0 milliequivalent/gram dry polymer.

9. The ion exchange membrane cell according to claim 6, 2 or 3 wherein said cation exchange membrane is integrally formed by blending a fluorinated polymer having sulfonic acid groups and a fluorinated polymer having weakly acidic groups.

10. The ion exchange membrane cell according to any one of claims 6 to 9 wherein said cation exchange membrane is integrally formed by laminating a fluorinated polymer film having sulfonic acid groups and a fluorinated polymer film having weakly acidic groups.

11. The ion exchange membrane cell according to any one of claims 6 to 10 wherein said cation exchange membrane is a membrane in which sulfonic acid groups on a cathode side of a fluorinated polymer film having the sulfonic acid groups are converted to weakly acidic groups.

12. The ion exchange membrane cell according to any one of claims 6 to 11 wherein said cation exchange membrane is a membrane in which weakly acidic groups on an anode side of a fluorinated polymer film having the weakly acidic groups are converted to sulfonic acid groups.

13. The ion exchange membrane cell according to any one of claims 6 to 12 wherein the ion exchange groups having weaker acidity are carboxylic acid groups or phosphoric acid groups.

14. The ion exchange membrane cell according to any one of claims 6 to 13 wherein said cation exchange membrane is in contact with at least one of the anode and the cathode.

15. In an electrolytic cation exchange membrane having a gas and liquid permeable porous non-electrode layer on at least one side thereof, an improvement characterized in that said cation exchange membrane is formed by a fluorinated polymer having sulfonic acid groups and ion exchange groups having weaker acidity than the sulfonic acid groups.

16. The electrolytic cation exchange membrane according to claim 15 wherein the gas and liquid permeable porous layer is formed by an electrically conductive or non-conductive inorganic or organic material and applied in an amount of from 0.001 to 100 mg/cm².

17. The electrolytic cation exchange membrane according to claim 16 wherein said inorganic material is composed of a single substance, an alloy, an oxide, a hydroxide, a nitride or a carbide of a metal of Group IV-A, VI-B or V-B of the Periodic Table, an iron group metal, chromium, manganese or boron.

18. The electrolytic cation exchange membrane according to claim 16 wherein the organic material is a fluorinated resin, a polyamide resin, a polysulfonic resin, a polyphenyleneoxide resin, a polyphenylenesulfide resin, a polypropylene resin, or a polyimide resin.

19. The electrolytic cation exchange membrane according to any one of claims 15 to 18 wherein each of the sulfonic acid groups and ion exchange groups having weaker acidity has an ion exchange capacity of from 0.5 to 4.0 milliequivalent/gram dry polymer.

20. The electrolytic cation exchange membrane according to claim 15 or 19 wherein said cation exchange membrane is integrally formed by blending a fluorinated polymer having sulfonic acid groups and a fluorinated polymer having weakly acidic groups.

21. The electrolytic cation exchange membrane according to claim 15 or 19 wherein said cation exchange membrane is integrally formed by laminating a fluorinated polymer having sulfonic acid groups and a fluorinated polymer having weakly acidic groups.

22. The electrolytic cation exchange membrane according to claim 15 or 19 wherein said cation exchange membrane is a membrane in which sulfonic acid groups on one side of a fluorinated polymer film having the sulfonic acid groups are converted to weakly acidic groups.

23. The electrolytic cation exchange membrane according to claim 15 or 19 wherein said cation exchange membrane is a membrane in which weakly acidic groups on one side of a fluorinated film having the weakly acidic groups are converted to sulfonic acid groups.

24. The electrolytic cation exchange membrane according to claim 15 or 19 wherein the ion exchange groups having weaker acidity are carboxylic acid groups or phosphoric acid groups.

25. The electrolytic cation exchange membrane according to any one of claims 15 to 24 wherein said fluorinated polymer has recurring units (a) and (b);

wherein X represents a fluorine, chlorine or hydrogen atom or —CF₃; X' represents X or $CF_3(CF_2)_{\overline{m}}$; m represents an integer of 1 to 5; Y represents the following unit;

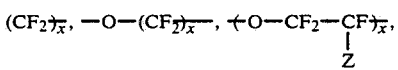

-continued
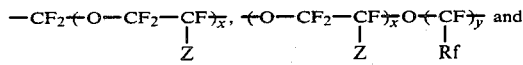
-continued
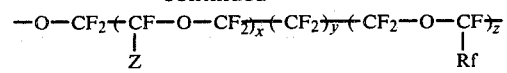
x, y and z respectively represent an integer of 1 to 10; Z and Rf represent —F or a $C_1$-$C_{10}$ perfluoroalkyl group; and A represents —COOM or —$SO_3M$ or a functional group which is convertible into —COOM or —$SO_3M$ by hydrolysis or neutralization such as —CN, —COF, —COOR or —$SO_2F$, and M represents hydrogen or an alkali metal atom.
* * * * *